United States Patent
Seki et al.

(10) Patent No.: US 11,401,980 B2
(45) Date of Patent: Aug. 2, 2022

(54) WET FRICTION PLATE, WET MULTI-PLATE CLUTCH DEVICE PROVIDED WITH SAME WET FRICTION PLATE, AND METHOD FOR MANUFACTURING WET FRICTION PLATE

(71) Applicant: Kabushiki Kaisha F.C.C., Hamamatsu (JP)

(72) Inventors: Kenichiro Seki, Shizuoka (JP); Kazuhiro Ichihara, Shizuoka (JP); Akihiro Yamashita, Shizuoka (JP); Koji Miyoshi, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/294,598

(22) PCT Filed: Nov. 1, 2019

(86) PCT No.: PCT/JP2019/043041
§ 371 (c)(1),
(2) Date: May 17, 2021

(87) PCT Pub. No.: WO2020/110602
PCT Pub. Date: Jun. 4, 2020

(65) Prior Publication Data
US 2022/0018400 A1 Jan. 20, 2022

(30) Foreign Application Priority Data
Nov. 28, 2018 (JP) .............................. JP2018-221823

(51) Int. Cl.
*F16D 13/52* (2006.01)
*F16D 13/64* (2006.01)

(52) U.S. Cl.
CPC ........... *F16D 13/648* (2013.01); *F16D 13/52* (2013.01); *F16D 2200/006* (2013.01)

(58) Field of Classification Search
CPC ............... F16D 13/648; F16D 69/0408; F16D 2069/002; F16D 2069/004; F16D 13/52; F16D 2300/10; F16D 2200/00
See application file for complete search history.

(56) References Cited

U.S. PATENT DOCUMENTS

| 2004/0050646 | A1  | 3/2004 | Matthes et al. |
| 2006/0124419 | A1* | 6/2006 | Kinoshita ............... F16H 45/02 |
|              |     |        | 192/3.29 |

(Continued)

FOREIGN PATENT DOCUMENTS

| EP | 0267027 A2 * | 5/1988 | ........... F16D 13/648 |
| JP | 9-166157 A   | 6/1997 | |

(Continued)

OTHER PUBLICATIONS

International Search Report (ISR) dated Dec. 24, 2019 filed in PCT/JP2019/043041.

(Continued)

*Primary Examiner* — Ernesto A Suarez
*Assistant Examiner* — Lillian T Nguyen
(74) *Attorney, Agent, or Firm* — Rankin, Hill & Clark LLP (57) ABSTRACT

Provided are a wet friction plate configured so that drag torque can be reduced while a manufacturing burden is reduced with a simple configuration, a wet multiplate clutch device including the wet friction plates, and a wet friction plate manufacturing method. A wet friction plate (200) includes friction members (210) provided on a flat plate annular core metal (201), having oil grooves (203), and made of a paper material. The friction members (210) include higher friction members (211) and lower friction members (212). The higher friction member (211) is formed such that the height thereof from a surface of the core metal (201) is higher than that of the lower friction member (212). In addition, the higher friction member (211) is formed with a less-elastically-deformable structure than that of the lower friction member (212). The lower friction member (212) is (Continued)

formed such that the height thereof from the surface of the core metal (201) is lower than that of the higher friction member (211). In addition, the lower friction member (212) is formed with a more-elastically-deformable structure than that of the higher friction member (211). The higher friction members (211) and the lower friction members (212) are alternately arranged along a circumferential direction on the core metal (201).

7 Claims, 5 Drawing Sheets (56) References Cited

U.S. PATENT DOCUMENTS

2009/0078527 A1* 3/2009 Mordukhovich ....... F16D 69/00
192/107 C

2012/0298463 A1* 11/2012 Tokumasu ............. F16D 13/72
192/66.3

FOREIGN PATENT DOCUMENTS

| | | | |
|---|---|---|---|
| JP | 2003-97613 A | 4/2003 | |
| JP | 2007155096 A | * 6/2007 | ............ F16D 13/64 |
| JP | 2008-75802 A | 4/2008 | |
| JP | 2012-207775 A | 10/2012 | |
| JP | 2014-81010 A | 5/2014 | |

OTHER PUBLICATIONS

Decision to Grant dated Mar. 10, 2020 for the corresponding Japanese Patent Application No. 2018-221823.

* cited by examiner

WET FRICTION PLATE, WET MULTI-PLATE CLUTCH DEVICE PROVIDED WITH SAME WET FRICTION PLATE, AND METHOD FOR MANUFACTURING WET FRICTION PLATE

TECHNICAL FIELD

The present invention relates to a wet friction plate used in lubricant oil. Specifically, the present invention relates to a wet friction plate suitable for a wet multiplate clutch device arranged between a motor and a drive target to be rotatably driven by the motor to transmit drive force of the motor to the drive target or block such transmission. Moreover, the present invention relates to a wet multiplate clutch device including the wet friction plates, and a method for manufacturing a wet friction plate.

BACKGROUND ART

Typically, on a vehicle such as a four-wheeled vehicle or a two-wheeled vehicle, a wet multiplate clutch device is mounted for transmitting rotary drive force of a motor such as an engine to a drive target such as a wheel or block such transmission. Generally, the wet multiplate clutch device transmits the rotary drive force or blocks such transmission in such a manner that two plates arranged facing each other in lubricant oil are pressed against each other.

In this case, one of two plates includes a wet friction plate having multiple friction members provided along a circumferential direction on surfaces of a flat plate annular core metal. For example, Patent Literature 1 below discloses a core metal formed in the shape of a corrugated plate including mountain and valley portions alternately repeated in a circumferential direction. A friction member with a low coefficient of friction is provided at the mountain portion. In addition, a friction member with a high coefficient of friction is provided at the valley portion. With this configuration, a disclosed multiplate friction engagement device can reduce drag torque.

CITATION LIST

Patent Literature

PATENT LITERATURE 1: JP-A-2012-207775

However, in the multiplate friction engagement device described in Patent Literature 1 above, the core metal needs to be in the corrugated plate shape. In addition, the friction members with the low coefficient of friction and the friction members with the high coefficient of friction each need to be bonded to the mountain and valley portions of the corrugated plate-shaped core metal. For this reason, problems such as a great manufacturing burden and a complicated configuration are caused. For the multiplate friction engagement device of this type, reduction of the drag torque is constantly demanded. Such drag torque reduction cannot be satisfied by the prior art described above.

The present invention copes with the above-described problems. An object of the present invention is to provide a wet friction plate configured so that drag torque can be reduced while a manufacturing burden is reduced with a simple configuration, a wet multiplate clutch device including these wet friction plates, and a wet friction plate manufacturing method.

SUMMARY OF INVENTION

In order to achieve the above-described object, a feature of the present invention is a wet friction plate which includes: multiple friction members arranged on a surface of a core metal, which is formed in a flat plate annular shape, along a circumferential direction through a clearance, in which the friction members include two types of higher friction member and lower friction member having elasticity in a thickness direction and having relatively-different heights from the surface of the core metal, and the higher friction member is formed less elastically deformable in the thickness direction than the lower friction member.

According to the feature of the present invention configured as described above, in the wet friction plate, the friction member has elasticity in the thickness direction. In addition, the friction members include two types of higher friction member and lower friction member having the relatively-different heights from the surface of the core metal. In addition, the wet friction plate is configured such that the higher friction member is less elastically deformable in the thickness direction than the lower friction member. With this configuration, when the wet friction plate and the separator plate rotate relative to each other with these plates being separated from each other, influence of viscous resistance of lubricant oil between the wet friction plate and the separator plate is reduced in the wet friction plate according to the present invention. Moreover, drag torque can be reduced. When the separator plate arranged facing the wet friction plate is separated, a distance between the lower friction member and the separator plate actively separated by strong elastic restoring force of the higher friction members is promptly increased in the wet friction plate according to the present invention. Thus, the drag torque can be reduced. In the configuration of the wet friction plate according to the present invention, the higher friction member is less elastically deformable and has high stiffness. Thus, durability against the separator plate and lubricant oil can be ensured even in the configuration including the higher friction members projecting as compared to the lower friction members.

Further, another embodiment of the present invention is that, in the wet friction plate, the higher friction member is formed higher by an amount of equal to or higher than 1% and equal to or lower than 25% of a thickness of the lower friction member.

According to another feature of the present invention configured as described above, the wet friction plate is formed such that the higher friction member is higher by an amount of equal to or higher than 1% and equal to or lower than 25% of the thickness of the lower friction member. Thus, even in the configuration including the higher friction member less elastically deformable than the lower friction member, the separator plate can closely contact the higher friction member and the lower friction member by pressing of the separator plate with the substantially same pressure as that in a typical case. For example, in a case where the thickness of the lower friction member is 0.4 mm, the higher friction member is formed higher by equal to or greater than 4 μm and equal to or less than 100 μm.

Still another feature of the present invention is that in the wet friction plate, each friction member includes a paper body containing a papermaking fiber and the higher friction member is formed with a higher density than that of the lower friction member and is accordingly formed less elastically deformable in the thickness direction than the lower friction member.

According to such still another feature of the present invention configured as described above, each friction member includes the paper body containing the papermaking fiber. In addition, the wet friction plate is formed such that the higher friction member has the higher density than that of the lower friction member. Thus, the higher friction member can be formed less easily elastically deformable in the thickness direction than the lower friction member. In this case, the higher friction member may be made of a material different from that of the lower friction member. Note that these members are made of the same type of material so that a friction member manufacturing burden can be reduced. In addition, uniform friction characteristics are easily achieved.

Further, still another feature of the present invention is that, in the wet friction plate, the higher friction member has a lower area ratio than that of the lower friction member.

According to such still another feature of the present invention configured as described above, in the wet friction plate, the higher friction member positioned closer to the separator plate which is about to separate than the lower friction member is to is formed to have the lower area ratio than that of the lower friction member. Thus, the drag torque can be effectively reduced.

According to still another feature of the present invention, in the wet friction plate, the lower friction member is formed such that the area thereof expands from the inside to the outside in a radial direction of the core metal.

According to such still another feature of the present invention configured as described above, in the wet friction plate, the lower friction member is formed such that the area thereof expands from the inside to the outside in the radial direction of the core metal. Thus, when the separator plate separates from the friction plate, lubricant oil on the lower friction member to which lubricant oil is guided earlier than to the higher friction member can be promptly guided to the outside in the radial direction. Consequently, a cooling effect and a lubrication effect are promptly produced. In this case, in the wet friction plate, some of the lower friction members on the core metal may be formed such that the areas thereof expand from the inside to the outside in the radial direction of the core metal. Alternatively, all of the lower friction members on the core metal may be formed such that the areas thereof expand from the inside to the outside in the radial direction of the core metal.

The present invention can be implemented not only as the invention relating to the wet friction plate, but also can be implemented as the invention relating to a wet multiplate clutch including the wet friction plates and the method for manufacturing the wet friction plate.

Specifically, it may only be required that the wet multiplate clutch device is provided with: multiple wet friction plates according to any one of claims 1 to 5; multiple flat plate annular separator plates to be pressed against the multiple wet friction plates or to be separated from the multiple wet friction plates; and clutch oil to be supplied to each of clearances among the wet friction plates and the separator plates. According to the wet multiplate clutch device configured as described above, features and advantageous effects similar to those of the wet friction plate can be expected.

Further, in this case, it may only be required that in the wet multiplate clutch device, the multiple wet friction plates are arranged at positions shifted in the circumferential direction of the core metal such that positions of the higher friction members in the circumferential direction do not overlap with each other and positions of the lower friction members in the circumferential direction do not overlap with each other between adjacent ones of the wet friction plates through the separator plate. According to this configuration, in the wet multiplate clutch device, a surface pressure upon pressing of the wet friction plates and the separator plates against each other can be decreased. Accordingly, a heat generation amount is decreased.

Moreover, it may only be required that a method for manufacturing a wet friction plate includes: a core metal preparation step of preparing the core metal; a pre-friction member preparation step of preparing a pre-higher friction member and a pre-lower friction member including two paper bodies made of papermaking fibers and having different thicknesses and formed as a higher friction member and a lower friction member; a pre-friction member arrangement step of arranging the pre-higher friction member and the pre-lower friction member on the surface of the core metal; and a friction member formation step of pressing the pre-higher friction member and the pre-lower friction member arranged on the core metal to compress and deform the pre-higher friction member and the pre-lower friction member to form the higher friction member and the lower friction member having different thicknesses, the higher friction member being less elastically deformable in a thickness direction than the lower friction member. According to the wet friction plate manufacturing method configured as described above, the above-described wet friction plate can be manufactured.

Further, in the wet friction plate manufacturing method, it is preferred that at the pre-friction member preparation step, the pre-higher friction member and the pre-lower friction member are arranged on each surface of the core metal, and at the friction member formation step, the pre-higher friction member and the pre-lower friction member arranged on each surface of the core metal are simultaneously pressed from both sides and are compressed and deformed. According to this configuration, in the wet friction plate manufacturing method, the higher friction members and the lower friction members can be efficiently formed on both surfaces of the core metal.

Moreover, in this case, it may only be required that in the wet friction plate manufacturing method, at the pre-friction member preparation step, the pre-higher friction members are arranged at an identical position in the circumferential direction on both surfaces of the core metal, and the pre-lower friction members are arranged at an identical position in the circumferential direction on both surfaces of the core metal. According to this configuration, in the wet friction plate manufacturing method, when both surfaces of the core metal are pressed at the same time, the higher friction members positioned back to back can be efficiently pressed at the same time to form the wet friction plate.

DESCRIPTION OF EMBODIMENTS

Figure 1:
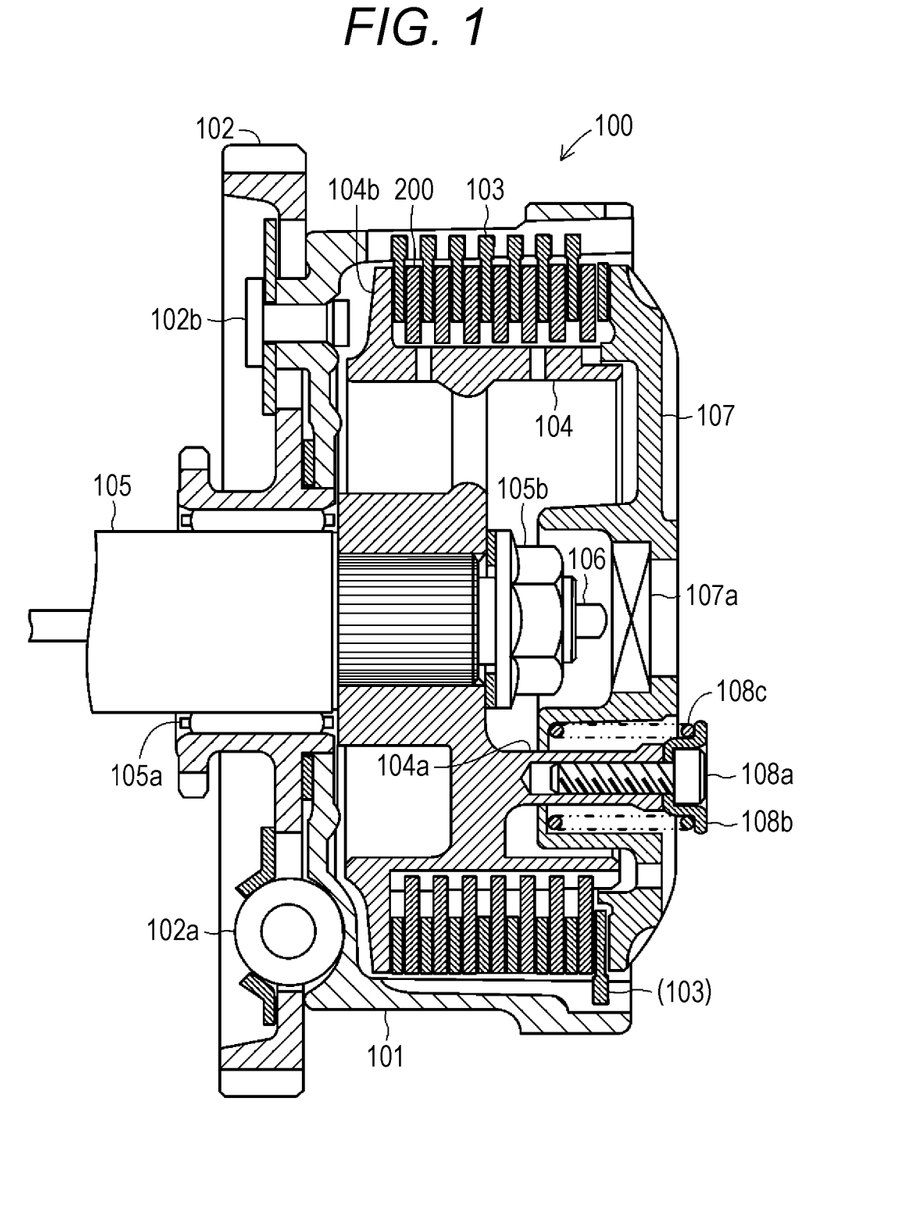
FIG. 1 is a sectional view of an entire configuration of a wet multiplate clutch device including wet friction plates according to one embodiment of the present invention.

Hereinafter, one embodiment of a wet friction plate, a wet multiplate clutch device including the wet friction plates, and the method for manufacturing the wet friction plate according to the present invention will be described with reference to the drawings. FIG. 1 is a schematic sectional view of an entire configuration of a wet multiplate clutch device 100 including wet friction plates 200 according to the present invention. Note that for the sake of easy understanding of the present invention, each figure as a reference in the present specification schematically illustrates the configuration of the invention by, e.g., exaggerating some components. Thus, in some cases, the dimensions of each component, a ratio between components or the like in the figures might be different from actual dimensions, ratios or the like. The wet multiplate clutch device 100 is a mechanical device configured to transmit drive force of an engine (not shown) as a motor of a two-wheeled vehicle (a motorcycle) to a wheel (not shown) as a drive target or block such transmission. The wet multiplate clutch device 100 is arranged between the engine and a transmission (not shown).

(Configuration of Wet Multiplate Clutch Device 100)

The wet multiplate clutch device 100 includes an aluminum alloy housing 101. The housing 101 is a member formed in a bottomed cylindrical shape and forming part of a housing of the wet multiplate clutch device 100. An input gear 102 is, with a rivet 102b, fixed to a left side surface of the housing 101 as viewed in the figure through a torque damper 102a. The input gear 102 is rotatably driven by engaging with a not-shown drive gear to be rotatably driven by drive of the engine. On an inner peripheral surface of the housing 101, each of multiple (eight in the present embodiment) separator plates 103 is, by spline fitting, held along an axial direction of the housing 101 in a state in which the separator plates 103 are displaceable and rotatable integrally with the housing 101.

The separator plate 103 is a flat plate annular component to be pressed against a later-described wet friction plate 200. The separator plate 103 is formed in such a manner that a thin plate member made of a SPCC (cold-rolled steel plate) material is punched in an annular shape. In this case, an external-tooth spline to be fitted in an internal-tooth spline formed at the inner peripheral surface of the housing 101 is formed at an outer peripheral portion of the separator plate 103. A later-described not-shown oil groove having a depth of several μm to several tens of μm for holding lubricant oil is formed at each side surface (front and back surfaces) of the separator plate 103. For the purpose of improving abrasion resistance, surface hardening treatment is performed for each side surface (the front and back surfaces) of the separator plate 103 at which the oil groove is formed. Note that these oil grooves of the separator plate and such surface hardening treatment for the separator plate may be omitted. The oil grooves and the surface hardening treatment do not directly relate to the present invention, and therefore, description thereof will be omitted.

A friction plate holder 104 formed in a substantially cylindrical shape and provided concentrically with the housing 101 is arranged inside the housing 101. At an inner peripheral surface of the friction plate holder 104, many spline grooves are formed along an axial direction of the friction plate holder 104. A shaft 105 is spline-fitted in the spline grooves. The shaft 105 is a shaft body formed in a hollow shape, and one (the right side as viewed in the figure) end portion thereof rotatably supports the input gear 102 and the housing 101 through a needle bearing 105a. In addition, the shaft 105 supports the spline-fitted friction plate holder 104 in a fixed manner through a nut 105b. That is, the friction plate holder 104 rotates integrally with the shaft 105. On the other hand, the other (the left side as viewed in the figure) end portion of the shaft 105 is coupled to the not-shown transmission of the two-wheeled vehicle.

A shaft-shaped push rod 106 is arranged in a hollow portion of the shaft 105. The push rod 106 penetrates the hollow portion of the shaft 105 to protrude from one (the right side as viewed in the figure) end portion of the shaft 105. The side (the left side as viewed in the figure) of the push rod 106 opposite to the end portion protruding from one (the right side as viewed in the figure) end portion of the shaft 105 is coupled to a not-shown clutch operation lever of the two-wheeled vehicle. By operation of the clutch operation lever, the push rod 106 slides in the hollow portion of the shaft 105 along an axial direction of the shaft 105.

On an outer peripheral surface of the friction plate holder 104, adjacent ones of the multiple (seven in the present embodiment) wet friction plates 200 sandwich the separator plate 103. The wet friction plate 200 is, by spline fitting, held along the axial direction of the friction plate holder 104 in a state in which the wet friction plate 200 is displaceable and rotatable integrally with the friction plate holder 104.

The inside of the friction plate holder 104 is filled with a predetermined amount of lubricant oil (not shown). In addition, each of three tubular support rods 104a is formed inside the friction plate holder 104 (the figure illustrates only one). The lubricant oil is supplied to among the wet friction plates 200 and the separator plates 103. With this configuration, absorption of friction heat generated among the wet friction plates 200 and the separator plates 103 and abrasion of friction members 210 are prevented.

Each of three tubular support rods 104a is formed to protrude outwardly (the right side as viewed in the figure) in the axial direction of the friction plate holder 104. A pressing cover 107 arranged at a position concentric with the friction plate holder 104 is assembled with the tubular support rods 104a through a bolt 108a, a receiving plate 108b, and a coil spring 108c. The pressing cover 107 is formed in a substantially discoid plate having the substantially same outer diameter as the outer diameter of the wet friction plate 200, and is pressed toward a friction plate holder 104 side by the coil spring 108c. A release bearing 107a is provided at a position facing a right tip end portion of the push rod 106 as viewed in the figure at a center portion inside the pressing cover 107.

(Configuration of Wet Friction Plate 200)

Figure 2:
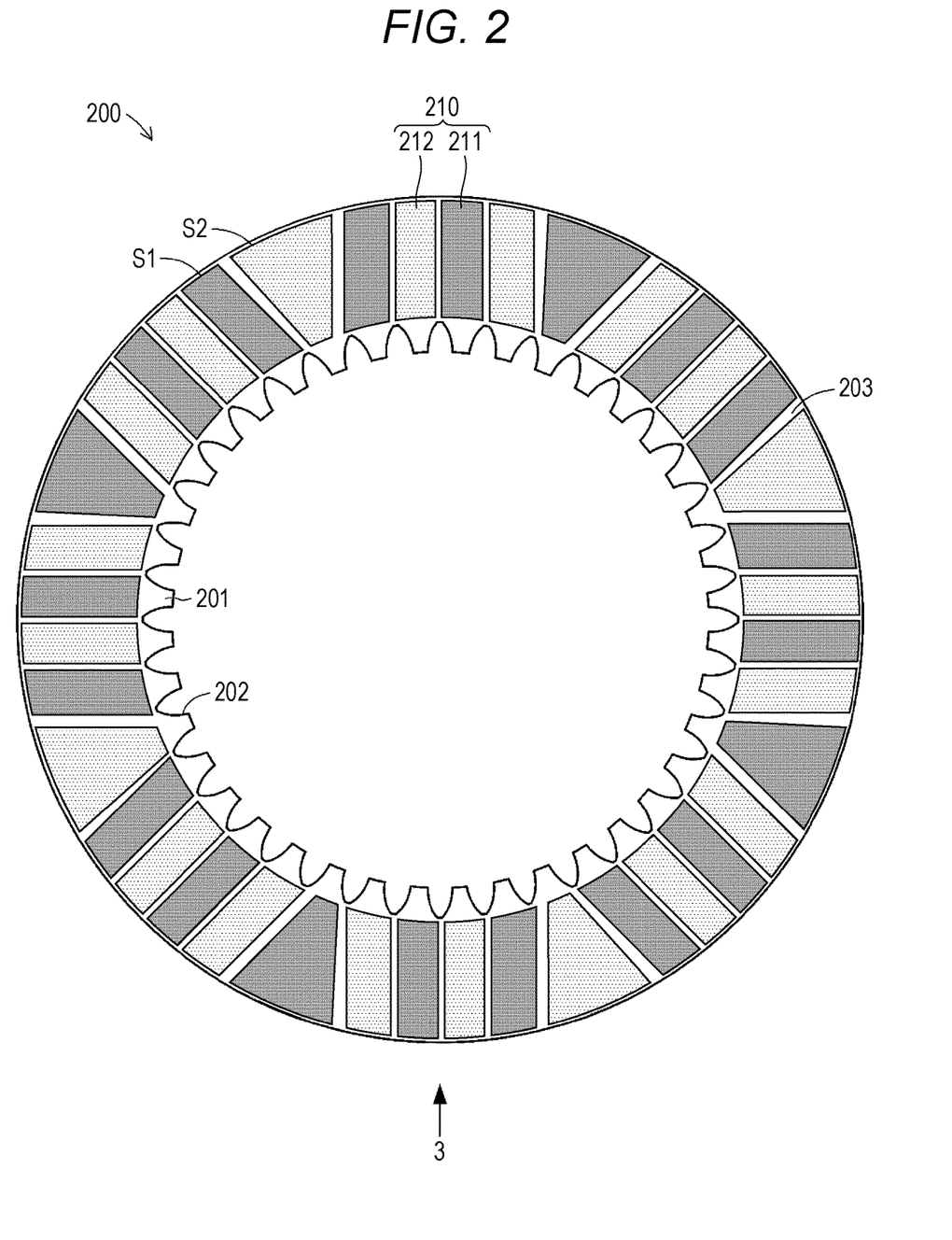
FIG. 2 is a schematic plan view of an outer appearance of the wet friction plate according to one embodiment of the present invention, the wet friction plate being assembled in the wet multiplate clutch device illustrated in FIG. 1.

Specifically, as illustrated in FIG. 2, the wet friction plate 200 includes oil grooves 203 and the friction members 210 provided on a flat plate annular core metal 201. The core metal 201 is a member as a base portion of the wet friction plate 200. The core metal 201 is formed in such a manner that a thin plate member made of a SPCC (cold-rolled steel plate) material is punched in a substantially annular shape. In this case, an internal-tooth spline 202 is formed at an inner peripheral portion of the core metal 201 such that the core metal 201 is spline-fitted to the friction plate holder 104.

At a side surface of the wet friction plate 200 facing the separator plate 103, i.e., a side surface of the core metal 201 facing the separator plate 103, the multiple (32 in the present embodiment) small piece-shaped friction members 210 are provided along a circumferential direction of the core metal 201 through the oil grooves 203 forming clearances.

The oil groove 203 is a flow path configured to guide lubricant oil between an inner peripheral edge and an outer peripheral edge of the core metal 201 of the wet friction plate 200. In addition, the oil groove 203 is also an oil holding portion configured to hold lubricant oil between the wet friction plate 200 and the separator plate 103. The oil groove 203 is formed to linearly extend along a radial direction between adjacent ones of the multiple small piece-shaped friction members 210.

The friction member 210 improves friction force for the separator plate 103. The friction member 210 is made of a small piece-shaped paper material bonded along the circumferential direction of the core metal 201. The friction member 210 is made of thermosetting resin hardened with a paper body being impregnated with the thermosetting resin.

In this case, the paper body includes a filler added to at least one of organic fibers or inorganic fibers. The organic fibers may be made of one or more types of fibers such as wood pulp, synthetic pulp, polyester-based fibers, polyamide-based fibers, polyimide-based fibers, modified polyvinyl alcohol fibers, polyvinyl chloride fibers, polypropylene fibers, polybenzimidazole fibers, acrylic fibers, carbon fibers, phenol fibers, nylon fibers, and cellulose fibers. Moreover, the inorganic fibers may be made of one or more types of fibers such as glass fibers, rock wool, potassium titanate fibers, ceramic fibers, silica fibers, silica-alumina fibers, kaolin fibers, bauxite fibers, kayanoid fibers, boron fibers, magnesia fibers, and metal fibers.

Moreover, the filler fulfills a function as a friction modifier and/or a solid lubricant. Such a filler may be made of one or more types of materials such as barium sulfate, calcium carbonate, magnesium carbonate, silicon carbide, boron carbide, titanium carbide, silicon nitride, boron nitride, alumina, silica, zirconia, cashew dust, rubber dust, diatom earth, graphite, talc, kaolin, magnesium oxide, molybdenum disulfide, nitrile rubber, acrylonitrile-butadiene rubber, styrene-butadiene rubber, silicon rubber, and fluorine-containing rubber. Further, examples of the thermosetting resin include phenol-based resin, melamine resin, epoxy resin, urea resin, and silicone resin.

Figure 3:
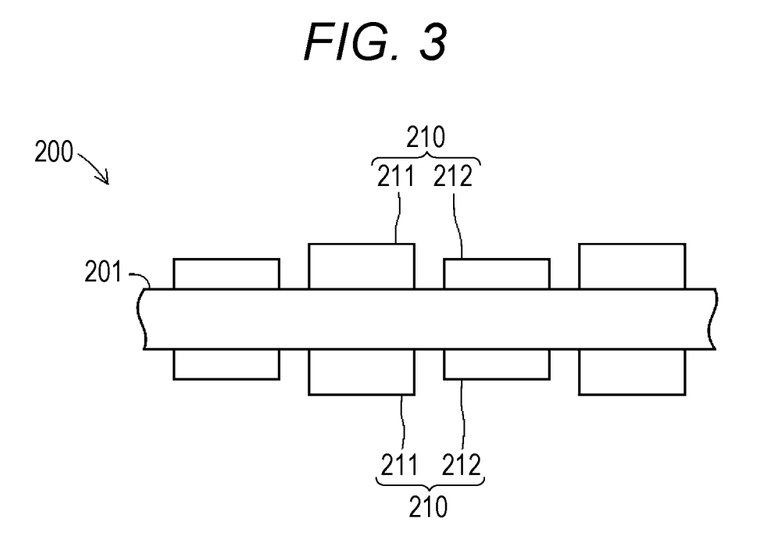
FIG. 3 is a schematic partial side view of the configuration of the wet friction plate illustrated in FIG. 2 from an arrow 3.

As illustrated in FIG. 3, the friction members 210 include higher friction members 211 and lower friction members 212. The higher friction member 211 is formed such that the height thereof from the surface of the core metal 201 is higher than that of the lower friction member 212. In addition, the higher friction member 211 is formed with a less-elastically-deformable structure than that of the lower friction member 212. In the present embodiment, the higher friction member 211 is compressed and deformed in a thickness direction, and therefore, is formed with a greater thickness than that of the lower friction member 212 and the less-elastically-deformable structure than that of the lower friction member 212. Moreover, in the present embodiment, the higher friction member 211 is formed with such a thickness that the higher friction member 211 is higher than a surface of the lower friction member 212 by 10 μm.

The less-elastically-deformable higher friction member 211 than the lower friction member 212 means that an elastic deformation amount in the thickness direction is smaller when the same pressing force is applied to the higher friction member 211 and the lower friction member 212. In other words, it means that greater force is necessary for the higher friction member 211 for elastically compressing and deforming the higher friction member 211 and the lower friction member 212 by the same amount. That is, it means that the elastic modulus of the higher friction member 211 is greater than the elastic modulus of the lower friction member 212. The elastic modulus described herein is a value obtained by division of stress by strain. In other words, the elastic modulus can be a value obtained by division of the applied force by the deformation amount.

The lower friction member 212 is formed such that the height thereof from the surface of the core metal 201 is lower than that of the higher friction member 211. In addition, the lower friction member 212 is formed with a structure which is more elastically deformable in the height direction than that of the higher friction member 211. In the present embodiment, the lower friction member 212 is compressed and deformed in the thickness direction, and therefore, is formed with a smaller thickness (0.4 mm) than that of the higher friction member 211 and the more-elastically-deformable structure than that of the higher friction member 211. The higher friction members 211 and the lower friction members 212 are alternately arranged along the circumferential direction on two surfaces of the core metal 201, and are fixed with an adhesive.

In this case, in the present embodiment, the friction members 210 are formed to have two shapes. The first shape is, as viewed in plane, a substantially rectangular shape which extends with a constant width along the radial direction of the core metal 201 (indicated by "S1" in FIG. 2). The second shape is, as viewed in plane, a substantially fan shape having a width expanding toward the outside in the radial direction of the core metal 201 (indicated by "S2" in FIG. 2). In this case, one of two corner portions of an outer peripheral portion of the friction member 210 formed in the substantially fan shape is chamfered. Each of the friction members 210 formed in these two shapes is formed such that the inner and outer peripheral portions thereof are in an arc shape about the center of rotation of the core metal 201.

Of the friction members 210 formed in these two shapes, four substantially-rectangular friction members 210 are arranged in parallel with each other through the oil grooves 203. In addition, substantially-fan-shaped friction members 210 are, through the oil grooves 203, arranged adjacent to a single friction member group including these four substantially-rectangular friction members 210. The higher friction members 211 and the lower friction members 212 are, independently of these substantially-rectangular friction members 210 and these substantially-fan-shaped friction members 210, alternately arranged along the circumferential direction on the core metal 201.

That is, the friction members 210 include the substantially-rectangular and substantially-fan-shaped higher friction members 211 and the substantially-rectangular and substantially-fan-shaped lower friction members 212. In this case, the higher friction members 211 and the lower friction members 212 are formed with the same area ratio, i.e., the higher friction members 211 and the lower friction members 212 are formed such that an area ratio between these members on one side of the core metal 201 is 1:1. Of the friction members 210, the higher friction members 211 are arranged at the same positions in the circumferential direction on two surfaces of the core metal 201, and the lower friction members 212 are arranged at the same positions in the circumferential direction on two surfaces of the core metal 201. That is, the friction members 210 are arranged on both surfaces of the core metal 201 such that the higher friction members 211 are arranged back to back at the same positions in the circumferential direction on the opposing plate surfaces and the lower friction members 212 are arranged back to back at the same positions in the circumferential direction on the opposing plate surfaces.

Note that FIG. 1 does not show the friction members 210. In FIG. 2, the higher friction members 211 are hatched in a dark color, and the lower friction members 212 are hatched in a light color.

(Method for Manufacturing Wet Friction Plate 200)

Next, the method for manufacturing the wet friction plate 200 configured as described above will be described with reference to FIGS. 4 and 6. First, a worker prepares the core metal 201 as a first step. Specifically, by metal machining with a processing device such as a press machine, the worker forms the core metal 201 by punching. That is, the step of manufacturing the core metal 201 is the same as a typical manufacturing step. The process of preparing the core metal 201 is equivalent to a core metal preparation step according to the present invention.

Figure 4:
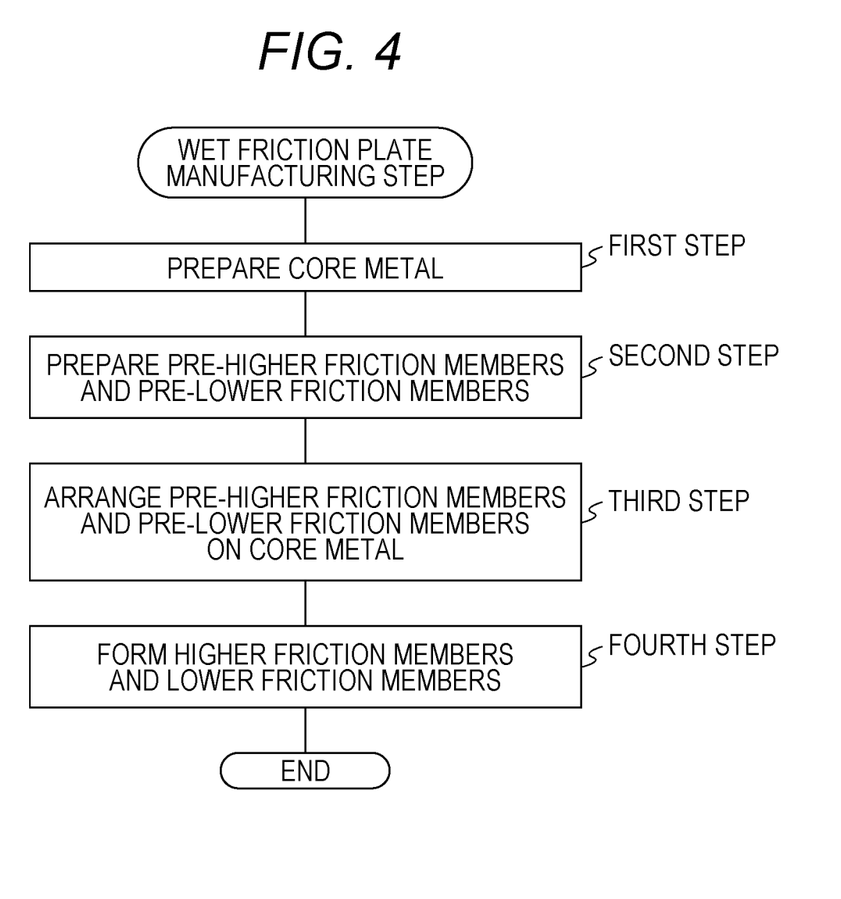
FIG. 4 is a flowchart of main steps in the process of manufacturing the wet friction plate according to one embodiment of the present invention.

Next, the worker prepares, at a second step, pre-higher friction members $211_P$ and pre-lower friction members $212_P$. The pre-higher friction member $211_P$ as described herein is a friction member as a semifinished product of the higher friction member 211 to be eventually processed into the higher friction member 211. The pre-higher friction member $211_P$ is formed with a thickness greater than the thickness of the higher friction member 211. Moreover, the pre-lower friction member $212_P$ is a friction member as a semifinished product of the lower friction member 212 to be eventually processed into the lower friction member 212. The pre-lower friction member $212_P$ is formed with a thickness greater than the thickness of the lower friction member 212.

The worker produces, by a papermaking process, each of the pre-higher friction members $211_P$ and the pre-lower friction members $212_P$. This papermaking process is the same as that of the prior art. That is, the papermaking process includes the step of hardening the thermosetting resin with which the sheet-shaped paper body is impregnated, the paper body being obtained in such a manner that a fibrous material filtered out of the slurry of the raw material including the fibrous material by means of a net is dried. In this manner, each of the pre-higher friction members $211_P$ and the pre-lower friction members $212_P$ having elasticity in the thickness direction is produced. That is, the process of preparing each of the pre-higher friction members $211_P$ and the pre-lower friction members $212_P$ is equivalent to a pre-friction member preparation step according to the present invention.

Next, the worker arranges, as a third step, each of the pre-higher friction members $211_P$ and the pre-lower friction members $212_P$ on the core metal 201. Specifically, the worker bonds, with the adhesive, each small piece of the pre-higher friction members $211_P$ and the pre-lower friction members $212_P$ to the surfaces of the core metal 201 along the circumferential direction. In this case, the worker may bond, to the core metal 201, the pre-higher friction members $211_P$ and the pre-lower friction members $212_P$ cut into small pieces in advance. Alternatively, upon bonding to the core metal 201, the worker can cut the pre-higher friction members $211_P$ and the pre-lower friction members $212_P$ into the small pieces.

The worker bonds, along the circumferential direction of each surface of the core metal 201, each small piece of the pre-higher friction members $211_P$ and the pre-lower friction members $212_P$ through the oil grooves 203. In this case, the worker arranges the pre-higher friction members $211_P$ at the same positions in the circumferential direction on both surfaces of the core metal 201, and arranges the pre-lower friction members $212_P$ at the same positions in the circumferential direction on both surfaces of the core metal 201. In this manner, the higher friction members 211 are arranged back to back, and the lower friction members 212 are arranged back to back. The process of bonding the pre-higher friction members $211_P$ and the pre-lower friction members $212_P$ onto the core metal 201 is equivalent to a friction member arrangement step according to the present invention.

Figure 5:
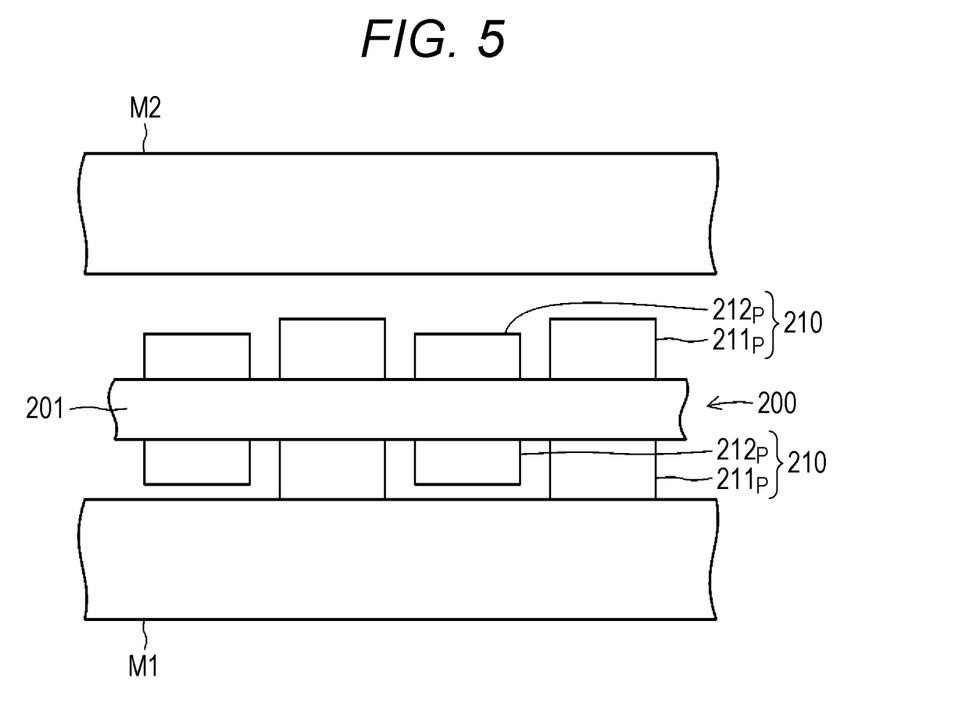
FIG. 5 is a schematic view for describing a core metal arranged between a pair of dies at the step of forming higher friction members and lower friction members at the step of manufacturing the wet friction plate in FIG. 4.

Next, the worker forms each of the higher friction members 211 and the lower friction members 212 as a fourth step. Specifically, as illustrated in each of FIGS. 5 and 6, the worker presses the core metal 201 arranged between two dies M1, M2 and having the pre-higher friction members $211_P$ and the pre-lower friction members $212_P$ bonded to the core metal 201. The dies M1, M2 as described herein are metal components for pressing the core metal 201 from both sides to compress and deform the pre-higher friction members $211_P$ and the pre-lower friction members $212_P$. The dies M1, M2 include plate-shaped bodies having flat surfaces facing the core metal 201. The dies M1, M2 are heated by a not-shown press device. These dies M1, M2 are held to approach each other or separate from each other.

Thus, the worker operates the press device, thereby pressing the core metal 201, onto which the pre-higher friction members $211_P$ and the pre-lower friction members $212_P$ are bonded, from both sides while heating the core metal 201. Such a pressing state is maintained for predetermined time. Thereafter, such a pressing state is canceled. In this case, the thicknesses of the pre-higher friction members $211_P$ and the pre-lower friction members $212_P$ slightly return as compared to those upon pressing due to spring back after these members pressed by the dies M1, M2 have been released. However, these thicknesses do not return to original thicknesses. That is, the pre-higher friction members $211_P$ and the pre-lower friction members $212_P$ are compressed and deformed in the thickness direction. In this manner, the higher friction members 211 and the lower friction members 212 having increased internal densities and smaller thicknesses are formed. Note that in FIG. 6, pressing by the dies M1, M2 is indicated by dashed arrows.

Figure 6:
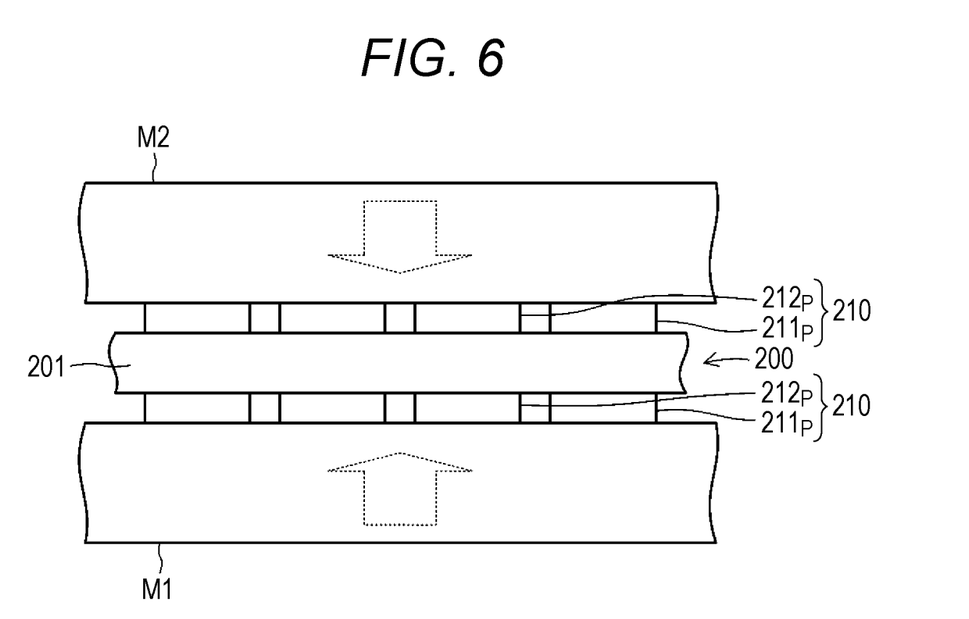
FIG. 6 is a schematic view for describing the core metal pressed between the pair of dies at the step of forming the higher friction members and the lower friction members at the step of manufacturing the wet friction plate in FIG. 4.

In this case, the pre-higher friction members $211_P$ and the pre-lower friction members $212_P$ are formed such that the pre-higher friction members $211_P$ have greater thicknesses than those of the pre-lower friction members $212_P$. As a result, a surface of the pre-higher friction member $211_P$ protrudes as compared to a surface of the pre-lower friction member $212_P$. Thus, the higher friction member 211 is, with the thickness greater than that of the lower friction member 212, maintained in a shape protruding as compared to the surface of the lower friction member 212. Moreover, the pre-higher friction member $211_P$ receives greater stress than the pre-lower friction member $212_P$ does. Thus, the pre-higher friction member $211_P$ is formed with a higher density than that of the pre-lower friction member $212_P$. As a result, the higher friction member 211 having the less-elastically-deformable structure than that of the lower friction member 212 is formed.

Thus, as illustrated in FIG. 3, the higher friction members 211 having the heights higher than those of the lower friction members 212 and having the less-elastically-deformable structure and the lower friction members 212 having the heights lower than those of the higher friction members 211 and having the more-elastically-deformable structure are formed. That is, the step of forming each of the higher friction members 211 and the lower friction members 212 is equivalent to a friction member formation step according to the present invention. Thereafter, the worker finishes the wet friction plate 200 through various subsequent steps such as the steps of adjusting and examining friction characteristics. However, these subsequent steps do not directly relate to the present invention, and therefore, description thereof will be omitted.

(Actuation of Wet Friction Plate 200)

Next, actuation of the wet friction plate 200 configured as described above will be described. As described above, the wet friction plates 200 are, upon use, assembled in the wet multiplate clutch device 100. In this case, the wet friction plates 200 may be arranged such that between adjacent ones of the wet friction plates 200 through the separator plate 103, the higher friction members 211 face each other and the lower friction members 212 face each other. Note that the wet friction plates 200 can be arranged such that the higher friction members 211 do not face each other and the lower friction members 212 do not face each other. With this configuration, the wet multiplate clutch device 100 can decrease a surface pressure upon pressing of the wet friction plates 200 and the separator plates 103 against each other, thereby decreasing a heat generation amount.

The wet multiplate clutch device 100 is arranged between the engine and the transmission of the vehicle as described above. By operation of the clutch operation lever by a driver of the vehicle, the wet multiplate clutch device 100 transmits the drive force of the engine to the transmission, or blocks such transmission.

That is, in a case where the driver (not shown) of the vehicle operates the clutch operation lever (not shown) to retreat (displace to the left side as viewed in the figure) the push rod 106, the tip end portion of the push rod 106 does not press the release bearing 107a. Thus, the pressing cover 107 presses the separator plates 103 by elastic force of the coil spring 108c. Accordingly, the separator plates 103 and the wet friction plates 200 are in a friction-coupled state. In this state, all plates are pressed against the outer peripheral surface of the friction plate holder 104 while displacing toward a receiving portion 104b formed in a flange shape.

In this case, each of the higher friction members 211 and the lower friction members 212 closely contacts the separator plate 103 while being elastically deformed in the thickness direction by pressing by the separator plate 103. As a result, the drive force of the engine transmitted to the input gear 102 is transmitted to the transmission through the separator plates 103, the wet friction plates 200, the friction plate holder 104, and the shaft 105.

On the other hand, in a case where the driver of the vehicle operates the clutch operation lever (not shown) to advance (displace to the right side as viewed in the figure) the push rod 106, the tip end portion of the push rod 106 presses the release bearing 107a. Thus, the pressing cover 107 displaces to the right side as viewed in the figure against the elastic force of the coil spring 108c. Then, the pressing cover 107 and the separator plates 103 are separated from each other. Accordingly, the separator plates 103 and the wet friction plates 200 displace to a pressing cover 107 side, and the state in which all plates are pressed against each other and coupled to each other is canceled. Thus, all plates are separated from each other. As a result, the drive force is no longer transmitted from the separator plates 103 to the wet friction plates 200. As a result, transmission of the drive force, which is transmitted to the input gear 102, of the engine to the transmission is blocked.

The higher friction member 211 is formed less elastically deformable than the lower friction member 212, and has greater restoring force. In addition, the higher friction member 211 has a greater amount of compression deformation by the separator plate 103 than that of the lower friction member 212. Thus, in a case where the separator plate 103 and the wet friction plate 200 separate from each other, the wet friction plate 200 promptly pushes back the separator plate 103 such that these plates separate from each other. In the wet friction plate 200, the lower friction member 212 separates from the separator plate 103 earlier than the higher friction member 211 does. Thus, lubricant oil quickly flows onto the lower friction member 212. Thus, the separator plate 103 is more easily separated. In addition, cooling and lubrication of the lower friction member 212 are promoted.

In the wet friction plate 200, the higher friction member 211 is formed to protrude as compared to the lower friction member 212. Thus, the lower friction member 212 is farther from the separator plate 103 than the higher friction member 211 is from. With these members, when the separator plates 103 and the wet friction plates 200 separate from each other in the wet multiplate clutch device 100, less lubricant oil is present between the separator plate 103 and the wet friction plate 200. Thus, drag torque can be reduced. In the wet multiplate clutch device 100, the wet friction plates 200 and the separator plates 103 separated from each other rotate relative to each other. In this case, influence of viscous resistance of lubricant oil present among the wet friction plates 200 and the separator plates 103 can be reduced. Thus, the drag torque can be reduced.

Figure 7:
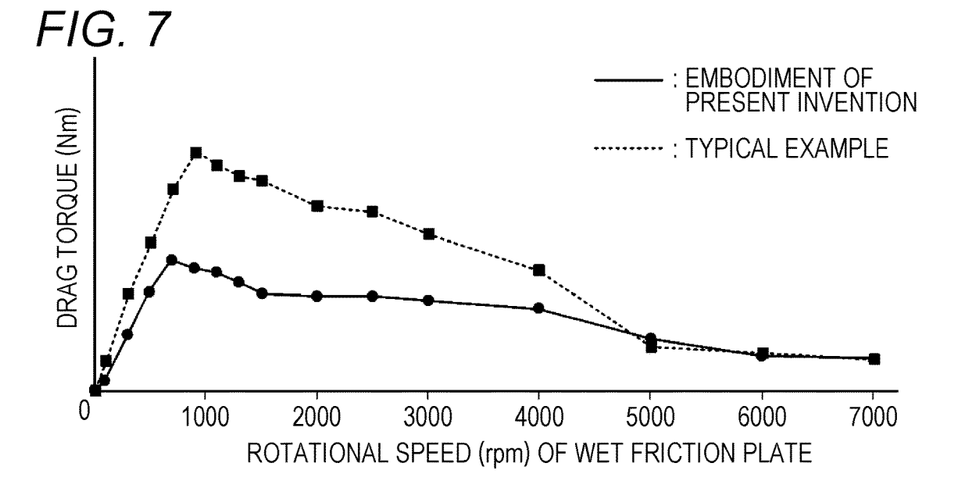
FIG. 7 is a graph of measurement results obtained in such a manner that drag torque in the wet multiplate clutch device including the wet friction plates according to one embodiment of the present invention and drag torque in a wet multiplate clutch device including typical wet friction plates are measured for each rotational speed.

Results of experiment conducted by the inventor(s) of the present invention will be described herein. FIG. 7 is a graph showing measurement results obtained in such a manner that the drag torque in the wet multiplate clutch device 100 including the wet friction plates 200 according to the invention of the present application and drag torque in a wet multiplate clutch device 100 including typical wet friction plates are measured for each rotational speed. In this case, in the typical wet friction plate, all friction members 210 have a constant thickness (e.g., the same height as that of a higher friction member 211 or a lower friction member 212). A plan view thereof is the same as that of the wet friction plate 200 illustrated in FIG. 2.

According to these experimental results, it can be confirmed that the effect of reducing the drag torque is noticeable within a rotational speed range of the wet friction plate 200 from 500 rpm to 4000 rpm. In this case, when the rotational speed of the wet friction plate 200 is 1500 rpm, a drag torque reduction effect of 53% is achieved as compared to the drag torque in the prior art. Specifically, in a low rotation range, the drag torque reduction effect can be confirmed.

As can be understood from description of actuation above, according to the above-described embodiment, the friction member 210 is configured such that the friction member 210 has the elasticity in the thickness direction. In addition, the wet friction plate 200 has two types of higher friction member 211 and lower friction member 212 having the relatively-different heights from the surface of the core metal 201. In addition, the higher friction member 211 is formed less elastically deformable in the thickness direction than the lower friction member 212. Thus, according to the wet friction plate 200, when the separator plate 103 arranged facing the wet friction plate 200 is separated, the separator plate 103 can be actively separated by the strong elastic restoring force of the higher friction members 211. Thus, a distance to the lower friction member 212 is promptly increased. This can reduce the drag torque. In the wet multiplate clutch device 100, the wet friction plates 200 and the separator plates 103 separated from each other rotate relative to each other. In this case, the influence of the viscous resistance of lubricant oil present among the wet friction plates 200 and the separator plates 103 can be reduced. Thus, the drag torque can be reduced. The wet friction plate 200 is configured such that the higher friction members 211 have high stiffness and are less elastically deformable. Thus, even if the wet friction plate 200 is configured such that the higher friction members 211 project as compared to the lower friction members 212, durability against the separator plate and lubricant oil can be ensured.

Further, implementation of the present invention is not limited to the above-described embodiment, and various changes can be made without departing from the object of the present invention. Note that in each variation described below, reference numerals corresponding to those assigned to the wet friction plate 200 are used to represent components similar to those of the wet friction plate 200 in the above-described embodiment. Moreover, description thereof will be omitted.

For example, in the above-described embodiment, the higher friction member 211 is formed such that a surface thereof is higher than the surface of the lower friction member 212 by 10 μm. However, it may only be required that the higher friction member 211 is formed such that the height thereof from the surface of the core metal 201 is greater than that of the surface of the lower friction member 212. In this case, the higher friction member 211 may be formed such that the thickness thereof is greater than the thickness of the lower friction member 212 by an amount of equal to or higher than 1% and equal to or lower than 25%. According to this configuration, even if the wet friction plate 200 has such a configuration that the higher friction member 211 is less elastically deformable than the lower friction member 212, the separator plate can closely contact the higher friction members 211 and the lower friction members 212 by pressing with the substantially same pressure as that of the typical case. Note that in the above-described embodiment, the lower friction member 212 having a thickness of 0.4 mm is formed. Note that these thicknesses of the lower friction member 212 and the higher friction member 211 can be set as necessary according to the specifications of the wet multiplate clutch device 100. These thicknesses are not limited to those of the above-described embodiment.

The higher friction member 211 can be formed such that the height thereof is greater than the thickness of the lower friction member 212 by higher than 25%. Note that in this case, the pressing force of the separator plate 103 needs to be increased for causing the separator plate 103 to closely contact the lower friction members 212.

In the above-described embodiment, the higher friction member 211 and the lower friction member 212 are formed to have the different thicknesses. However, it may only be required that the higher friction member 211 is formed such that the height thereof from the surface of the core metal 201 is greater than that of the surface of the lower friction member 212. Thus, the higher friction member 211 can be formed with the same thickness as that of the lower friction member 212. In addition, a raised base for increasing the height of the higher friction member 211 can be also provided on the surface of the core metal 201. In this case, the higher friction member 211 is provided on the base.

In the above-described embodiment, the higher friction member 211 having a higher density than that of the lower friction member 212 is formed. Thus, the higher friction member 211 is formed less elastically deformable in the thickness direction than the lower friction member 212. However, it may only be required that the higher friction member 211 is formed less elastically deformable in the thickness direction than the lower friction member 212. Thus, the higher friction member 211 may be formed less elastically deformable in the thickness direction than the lower friction member 212 by using a material different from the lower friction member 212, such as fibers, a filler, or a resin material.

In the above-described embodiment, the friction members 210 are provided such that the area ratio between the higher friction member 211 and the lower friction member 212 is set to 1:1. However, the friction members 210 may be provided such that one of the higher friction member 211 or the lower friction member 212 may have a greater area ratio than that of the other one of the higher friction member 211 or the lower friction member 212. In this case, the friction members 210 can be provided such that the area ratio of the higher friction member 211 is set smaller than the area ratio of the lower friction member 212. According to this configuration, in the wet friction plate 200, the higher friction members 211 positioned closer to the separator plate 103, which is about to separate, than the lower friction member 212 is to are formed with a smaller area ratio than that of the lower friction member 212. Thus, the drag torque can be effectively reduced.

In the above-described embodiment, the higher friction members 211 and the lower friction members 212 are alternately arranged along the circumferential direction of the core metal 201. However, it may only be required that the higher friction members 211 and the lower friction members 212 are substantially equally arranged along the circumferential direction of the core metal 201. Thus, the higher friction members 211 or the lower friction members 212 may be arranged along the circumferential direction of the core metal 201 through two or more lower friction members 212 or higher friction members 211.

Figure 8:
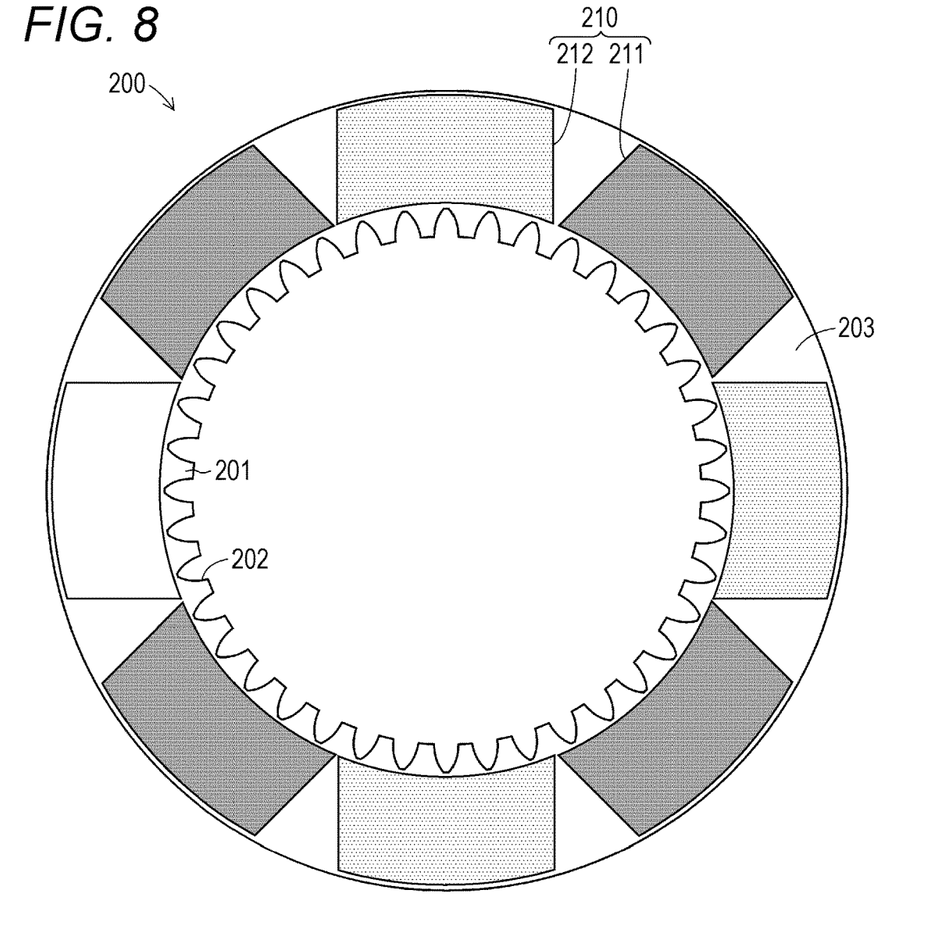
FIG. 8 is a schematic plan view of an outer appearance of a wet friction plate according to a variation of the present invention.

In the above-described embodiment, the friction members 210 have two shapes of the substantially rectangular shape and the substantially fan shape. However, the shapes of the friction members 210 are not specifically limited. Needless to say, the shapes of the friction members 210 may be shapes including a single shape or multiple shapes other than the substantially rectangular shape and the substantially fan shape. For example, as illustrated in FIG. 8, the friction members 210 can be formed as the higher friction members 211 and the lower friction members 212 formed in the same shape. Note that in FIG. 8, the higher friction members 211 are hatched in a dark color, and the lower friction members 212 are hatched in a light color.

In this case, the lower friction member 212 may be formed in a shape having an area expanding from the inside to the outside in the radial direction of the core metal 201, such as the substantially fan shape in the above-described embodiment. According to this configuration, when the separator plate 103 separates from the friction members 210, the wet friction plate 200 can promptly guide, to the outside in the radial direction, lubricant oil on the lower friction members 212 to which lubricant oil is guided earlier than to the higher friction members 211. As described above, a cooling effect and a lubrication effect can be promptly produced. In this case, the wet friction plate 200 may be formed such that the areas of some of the lower friction members 212 on the core metal 201 expand from the inside to the outside in the radial direction of the core metal 201. Alternatively, the wet friction plate 200 may be formed such that the areas of all of the lower friction members 212 on the core metal 201 expand from the inside to the outside in the radial direction of the core metal 201.

In the above-described embodiment, in the wet friction plate 200, the higher friction members 211 and the lower friction members 212 are arranged in such a positional relationship that these friction members are arranged back to back on both surfaces of the core metal 201. According to this configuration, at the above-described fourth step, when the core metal 201 is pressed from both sides, the higher friction members on both surfaces of the core metal 201 can be efficiently pressed at the same time to form the wet friction plate 200. However, in the wet friction plate 200, the higher friction members 211 and the lower friction members 212 can be arranged in a positional relationship shifted in the circumferential direction, i.e., such a positional relationship that these friction members are not arranged back to back on both surfaces of the core metal 201.

In the above-described embodiment, the friction member 210 is made of the paper material. However, the friction member 210 can be made of a material other than the paper, such as a cork material, a rubber material, or a glass yarn.

In the above-described embodiment, in the wet multiplate clutch device 100, the higher friction members 211 do not face each other and the lower friction members 212 do not face each other between adjacent ones of the wet friction plates 200 through the separator plate 103. Thus, adjacent ones of the wet friction plates 200 are held on the friction plate holder 104 with these wet friction plates 200 being shifted from each other in the circumferential direction. However, in the wet multiplate clutch device 100, the higher friction members 211 can face each other and the lower friction members 212 can face each other between adjacent ones of the wet friction plates 200 through the separator plate 103. In this case, adjacent ones of the wet friction plates 200 are held on the friction plate holder 104 with the positions of these wet friction plates 200 in the circumferential direction being aligned to each other.

In the above-described embodiment, the pre-higher friction members $211_P$ and the pre-lower friction members $212_P$ are produced in production of the wet friction plate 200. Thereafter, these members on the core metal 201 are pressed to form the higher friction members 211 and the lower friction members 212. However, the wet friction plate 200 can be produced by a method other than that of the above-described embodiment. For example, the pre-higher friction members $211_P$ and the pre-lower friction members $212_P$ arranged on a plate-shaped body other than the core metal 201 in the wet friction plate 200 may be pressed by the dies M1, M2. Thereafter, the higher friction members 211 and the lower friction members 212 formed as described above may be bonded onto the core metal 201. As described above, in production of the wet friction plate 200, the higher friction members 211 and the lower friction members 212 can be formed depending on the material. In this case, the higher friction members 211 and the lower friction members 212 can be directly bonded to the core metal 201. According to this configuration, the step of producing and compressing and deforming the pre-higher friction members $211_P$ and the pre-lower friction members $212_P$ can be omitted for the wet friction plate 200.

In the above-described embodiment, the wet friction plates 200 are held on the friction plate holder 104 to be rotatably driven integrally with the shaft 105. That is, the shaft 105 as an output shaft of the wet multiplate clutch device 100 is arranged facing the separator plates 103 to be rotatably driven by the rotary drive force of the engine. The wet friction plate 200 is applied as an opposing plate to be rotatably driven integrally with the shaft 105. However, the wet friction plate 200 can be applied to the separator plate 103 as a drive-side plate to be rotatably driven by the rotary drive force of the engine.

Further, in the above-described embodiment, the example where the wet friction plate according to the present invention is applied as the wet friction plate 200 used for the wet multiplate clutch device 100 in a two-wheeled vehicle has been described. However, it may be only required that the wet friction plate according to the present invention is a wet friction plate used in oil. Thus, the wet friction plate according to the present invention can be also applied to a wet multiplate clutch device in a four-wheeled vehicle. Needless to say, in this case, the wet friction plate according to the present invention can be also applied to an automatic transmission. Specifically, in case of wet multiplate clutch devices built in an automatic transmission, many wet multiplate clutch devices provided in the automatic transmission are operated separately. Thus, there are many opportunities that wet friction plates and separator plates separate from each other and rotate relative to each other. Thus, the influence of the viscous resistance of lubricant oil present among the wet friction plates and the separator plates is reduced, and the effect of reducing the drag torque is great. In addition to the wet multiplate clutch device 100, the wet friction plate according to the present invention can be also applied to a wet friction plate used for a brake device configured to put a brake on rotary motion by the motor.

LIST OF REFERENCE SIGNS

M1, M2 Pair of dies
S1 Substantially-rectangular friction member
S2 Substantially-fan-shaped friction member
100 Wet multiplate clutch device
101 Housing
102 Input gear
102a Torque damper
102b Rivet
103 Separator plate
104 Friction plate holder
104a Tubular support rod
105 Shaft
105a Needle bearing
105b Nut
106 Push rod
107 Pressing cover
107a Release bearing
108a Bolt
108b Receiving plate
108c Coil spring
200 Wet friction plate
201 Core metal
202 Spline
203 Oil groove
210 Friction member
211 Higher friction member 211$_P$ Pre-higher friction member
212 Lower friction member
212$_P$ Pre-lower friction member

The invention claimed is:

1. A wet friction plate comprising:
multiple friction members arranged on a surface of a core metal, which is formed in a flat plate annular shape, along a circumferential direction through a clearance,
wherein the friction members include two types of higher friction member and lower friction member having elasticity in a thickness direction and having relatively-different heights from the surface of the core metal,
a height of the higher friction member from the surface of the core metal is higher than a height of the lower friction member from the surface of the core metal, and
the higher friction member is formed less elastically deformable in the thickness direction than the lower friction member.

2. The wet friction plate according to claim 1, wherein the higher friction member is formed higher by an amount of equal to or higher than 1% and equal to or lower than 25% of a thickness of the lower friction member.

3. The wet friction plate according to claim 1, wherein each friction member includes a paper body containing a papermaking fiber, and
the higher friction member is formed with a higher density than that of the lower friction member, and accordingly, is formed less elastically deformable in the thickness direction than the lower friction member.

4. The wet friction plate according to any claim 1, wherein the higher friction member has a lower area ratio than that of the lower friction member.

5. The wet friction plate according to claim 1, wherein the lower friction member is formed such that an area thereof expands from an inside to an outside in a radial direction of the core metal.

6. A wet multiplate clutch device comprising:
multiple wet friction plates according to claim 1;
multiple flat plate annular separator plates to be pressed against the multiple wet friction plates or to be separated from the multiple wet friction plates; and
clutch oil to be supplied to each of clearances among the wet friction plates and the separator plates.

7. The wet multiplate clutch device according to claim 6, wherein
the multiple wet friction plates are arranged at positions shifted in the circumferential direction of the core metal such that positions of the higher friction members in the circumferential direction do not overlap with each other and positions of the lower friction members in the circumferential direction do not overlap with each other between adjacent ones of the wet friction plates through the separator plate.

* * * * *